Dec. 31, 1946. S. W. BRIGGS 2,413,431
FILTER UNIT AND METHOD OF MAKING SAME
Filed March 31, 1942 3 Sheets-Sheet 1
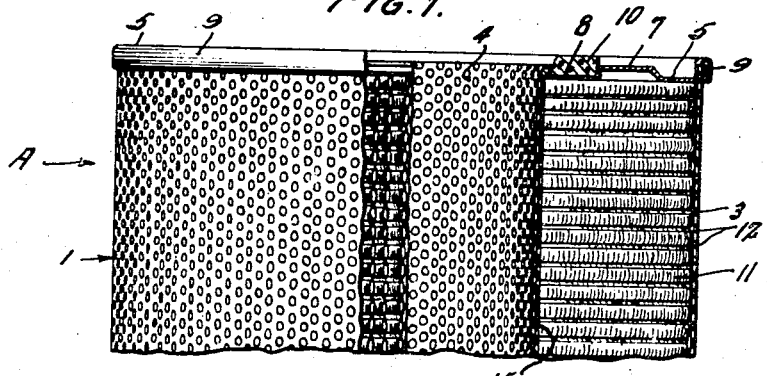
FIG. 1.
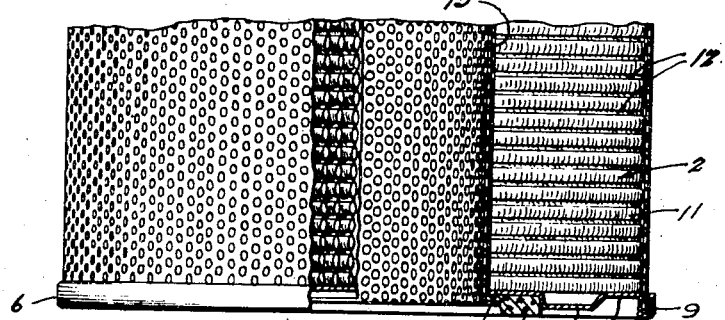
FIG. 2.
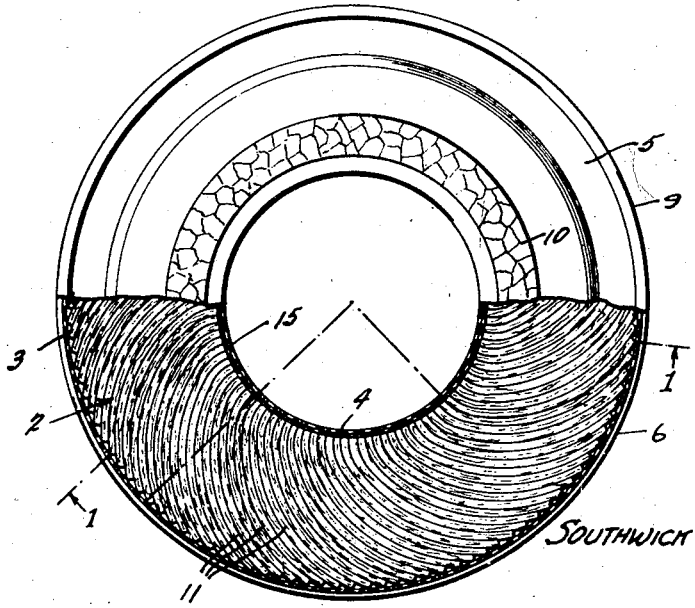
Inventor
SOUTHWICK W. BRIGGS
By Semmes, Keegin Beale & Semmes
Attorneys Dec. 31, 1946.  S. W. BRIGGS  2,413,431
FILTER UNIT AND METHOD OF MAKING SAME
Filed March 31, 1942  3 Sheets-Sheet 2
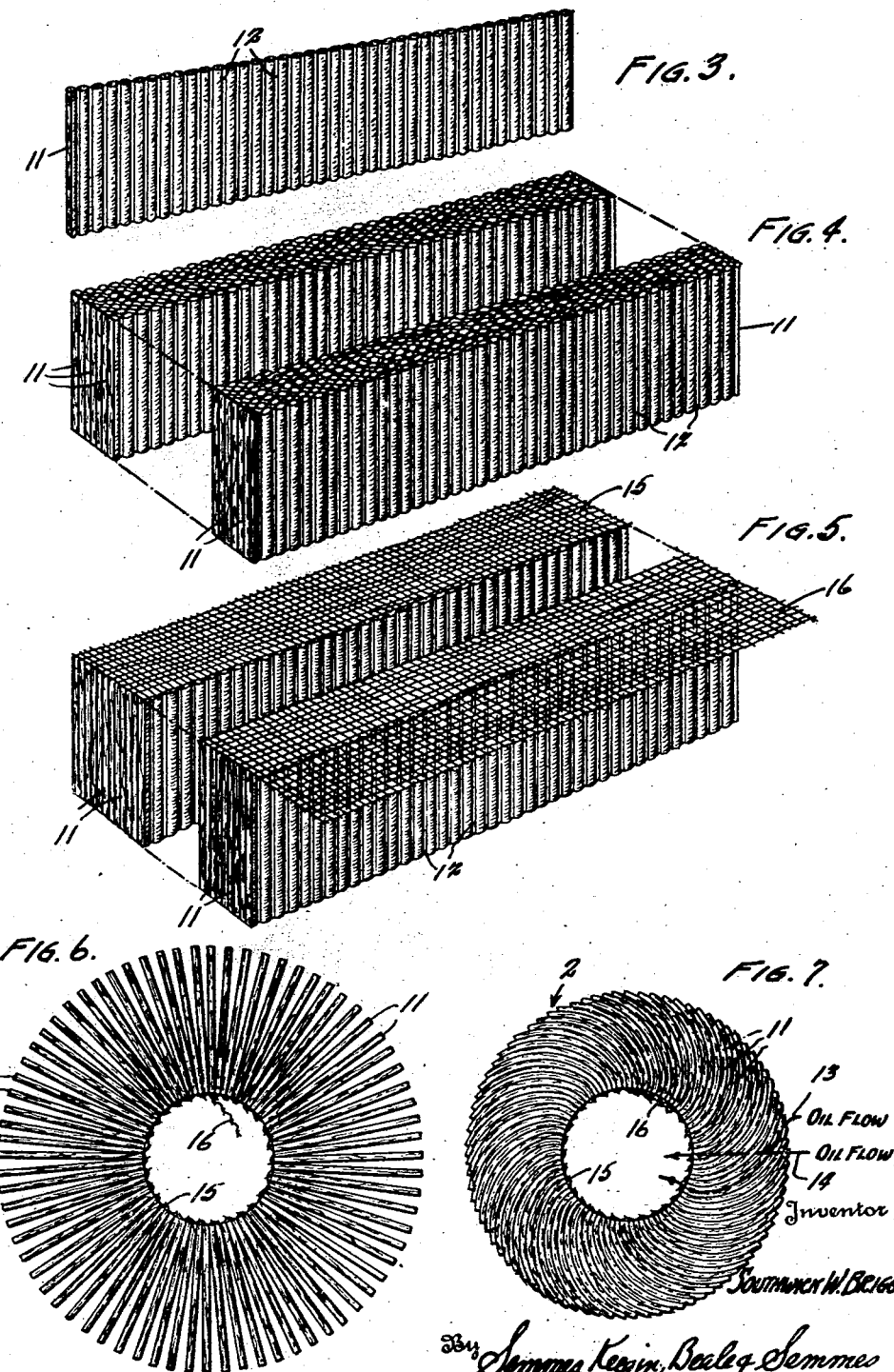

Dec. 31, 1946.  S. W. BRIGGS  2,413,431
FILTER UNIT AND METHOD OF MAKING SAME
Filed March 31, 1942  3 Sheets-Sheet 3
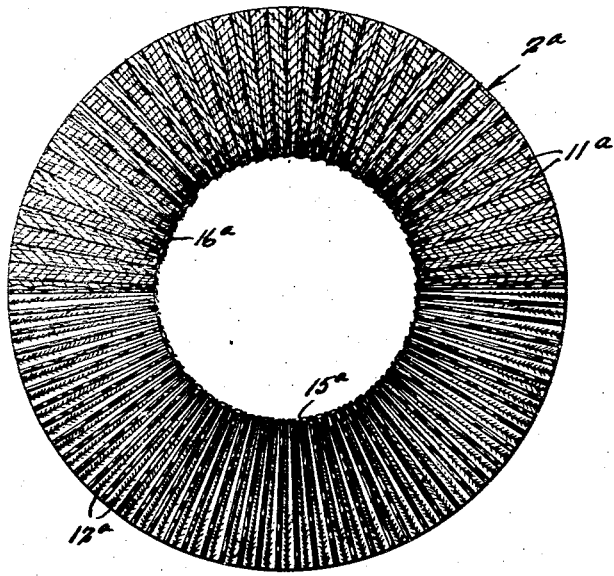
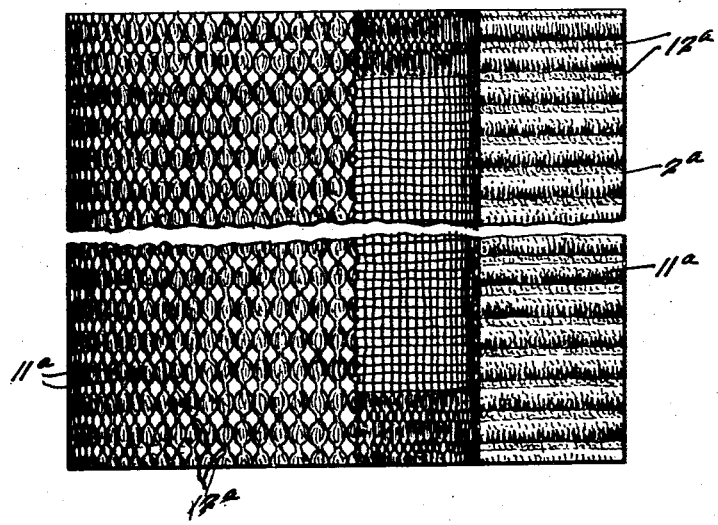
Inventor
SOUTHWICK W. BRIGGS
By Semmes, Keegin, Beale & Semmes
Attorneys Patented Dec. 31, 1946

2,413,431

UNITED STATES PATENT OFFICE 2,413,431

FILTER UNIT AND METHOD OF MAKING SAME

Southwick W. Briggs, Washington, D. C.

Application March 31, 1942, Serial No. 437,057

11 Claims. (Cl. 210—204)

This invention relates to filtration, and more especially to a filter unit which is especially suitable for the filtration of oil.

While efforts have been made to provide a filter made of cellulose, the filters hitherto available have not been entirely satisfactory. This has been partly due to failure to stand up in actual operation, and to the fact that their efficiency has not been as high as is desirable.

One of the objects of the present invention is to overcome the disadvantages inherent in previous cellulosic filters.

Another object of the present invention is to provide a filter composed of stacked or piled sheets of ribbed cellulosic material which is efficient in operation, inexpensive to construct, and which possesses a longevity in excess of the cellulosic filters hitherto available.

Still another object of this invention is to provide a filter cartridge in the form of a cylindrical tubular body and composed of a plurality of sheets of ribbed cellulosic material arranged circumferentially of the body with the individual strips extending from the inner to the outer peripheral surfaces of the tubular body.

Yet another object of this invention is to provide a filter cartridge in the form of a cylindrical tubular body and composed of a plurality of sheets of ribbed cellulosic material arranged circumferentially of the body with the individual strips extending from the inner to the outer peripheral surfaces of the tubular body, and in which the ribs of the stacked sheets extend from the inner to the outer peripheral surfaces of the tubular body.

A further object of this invention is to provide a filter cartridge in the form of a cylindrical tubular body and composed of a plurality of sheets of ribbed cellulosic material arranged circumferentially of the body with the individual strips extending from the inner to the outer peripheral surfaces of the tubular body, and in which the sheets are curved intermediate their outer and inner ends.

A still further object of this invention is to provide a method of manufacturing filter elements as embraced in the preceding objects.

To accomplish the above and other important objects, the invention in general embraces the concept of providing a filter composed of sheets or leaves of cellulosic wadding which comprises a number of loosely interlocked plies of webs of cellulosic fibers and which are embossed with parallel ribs running transversely of the leaves or sheets. This material is similar to the wadding described in my co-pending application, Serial No. 237,553, filed October 28, 1938, on which Patent No. 2,321,985 was issued June 15, 1943, differing therefrom in that in a roll of the material prior to cutting into sheets the ribs extend longitudinally of the rolled material instead of transversely thereof as in the aforesaid application. In the manufacture of filters, a plurality of these sheets are evenly stacked or piled and are permanently joined together at one edge. This stack of leaves or sheets is then bent into the form of a cylindrical tubular body with the joined edges defining the inner surface of the tubular body. The two outermost ends of the pile are then joined at their fastened edges in such a manner as to maintain the tubular form of the body permitting the unattached edges of the individual leaves or sheets to extend radially outwardly from the joined edges. The tubular body is then consolidated by effecting a relative rotation between the inner and outer surfaces of the thus formed body, causing the radially extending leaves or sheets to partially wrap together and lie in contact with adjacent leaves throughout their extent from the inner to the outer surfaces of the tubular body. The body is then wrapped to retain the leaves or sheets in their thus formed shape.

Alternatively, after stacking the leaves or sheets they may be considerably compressed before joining them together at one edge. When the pressure is relieved, the unjoined portions of the leaves or sheets expand to their original thickness and the stack tends to curve with the surface formed by the assembled joined edges of the sheets shorter than the surface formed by the unjoined edges of the sheets. When the thus deformed stack is further bent and secured to form a cylindrical tubular body, the leaves or sheets will extend radially outwardly and will, due to the compressed condition of their inner ends, lie in contact with each other throughout their extent from the inner to the outer surfaces of the body.

The finished filter body may be inserted within a wrapping or within a cage and forms a replaceable unit which may be employed in a clarifying device.

In the accompanying drawings, in which corresponding numerals refer to the same parts:

Figure 1 is an elevational view partly in section of a filter unit constructed in accordance with the invention.

Figure 2 is a top plan view of the filter unit partly in section.

Figure 3 is a perspective view of one of the sheets or leaves of cellulosic material employed in the filter.

Figure 4 is a perspective view showing how a plurality of these sheets or leaves are stacked in a pile, some of the intermediate sheets being omitted to better illustrate the stacking.

Figure 5 is a similar view of the pile of sheets or leaves shown in Figure 4 in which the leaves of the pile are fastened together with an adhesive strip.

Figure 6 is a top plan view of the cellulosic filter after the ends of the pile of sheets or leaves have been fastened together by means of the adhesive strip.

Figure 7 is a top plan view of the cellulosic filter element shown in Figure 6 after it has been consolidated.

Fig. 8 is a top plan view showing a modification of the invention.

Figure 9 is a side elevational view partly in section of the filter element shown in Figure 8.

As shown in the drawings, the present invention comprises a filter unit generally designated by the numeral A which comprises a shell 1 and a cellulosic filter element 2. The shell is formed of an outer perforated tube 3, an inner perforated tube 4 which is concentric with the outer tube and ring shaped top and bottom closures 5 and 6.

Closures 5 and 6 are formed with a stiffening corrugation 7 which surrounds and forms an annular gasket seat 8. The outer rim flanges 9 of the closures 5 and 6 are sealed respectively to each end of the outer tube 3 by forming an interlocking seam between the flanges 9 and the ends of the tube 3. The ends of the inner tube 4 are sealed to the closures 5 and 6 by flanging said ends over cork or other suitable gaskets 10 which are positioned in the gasket seats 8. Other types of sealing the ends of the filter element 2 may be substituted for the specific closure means here disclosed.

The cellulosic filter element 2 is of cylindrical tubular formation and is assembled in the filter unit between the outer cylindrical tubular wall 3 and the inner cylindrical tubular wall 4. As is clearly shown in Figs. 2, 6 and 7, one tubular filter element 2 is formed of a plurality of sheets or leaves 11 of cellulosic material. This material is similar to the wadding described in my copending application, Serial No. 237,553, filed October 28, 1938, differing therefrom in that in a roll of the material prior to cutting into sheets the ribs extend longitudinally of the rolled material instead of transversely thereof as in the aforesaid application. The sheets 11 of cellulosic material are assembled with one of their edges forming the inner surface of the tubular body 2 of filter material and with the opposite edges thereof forming the outer surface of said cylindrical tubular body.

Sheets 11 of the cellulosic wadding are formed of a plurality of plies, the exact number of which will depend upon the particular purpose to which the filter is to be applied, and may be, for instance, 4-ply, 6-ply, 8-ply, 10-ply, 12-ply, etc. To facilitate the flow of the liquid to be filtered through the cellulosic material, the sheets as shown in the drawings are provided with parallel grooves 12 on each surface thereof which give the corrugated appearance to the sheets. The grooves 12 on one side of the sheet are aligned with those on the opposite side thereof so that the sheet has the general appearance as indicated in Fig. 3 of the drawings. By providing the sheets with the grooves 12, the sheets form between them, when assembled, passages for the flow of the liquid to be filtered, and the filtering action in flowing through the passages is effected by adsorption of the material to be separated on the walls of the passages.

As clearly shown in Fig. 1 of the drawings, the grooves 12 extend from the inner to the outer edges of the sheets so that the channels for the flow of the liquid to be filtered will extend from the outer periphery of the cylindrical tubular body to the inner periphery thereof.

In the form of invention shown in Figs. 1 to 7 of the drawings, the sheets or leaves 11 of cellulosic material are curved intermediate the edges thereof forming the inner and outer peripheries of the tubular body, and in this construction the passages or channels for the flow of liquid which are formed by the grooves 12 in the surfaces of the sheets will likewise be curved in the same manner as are the sheets. In a filter element so constructed, the flow of the liquid to be filtered will primarily be along the channels which provide a comparatively unrestricted passage for the flow of the fluid as indicated by the arrow to which reference character 13 has been applied. In addition to this flow of the oil or liquid to be filtered through the filter element 2, there will be a truly radial flow of the liquid from the outer to the inner surface of said tubular body. This flow of liquid will penetrate through the surfaces of the sheets 11 as indicated by arrow 14. The flow of the liquid to be filtered along the direction indicated by the arrow 14 will result in what may be termed a true filtering action in that the liquid will actually flow through pores in the filter material. Thus liquid passing through this filter element may be subjected to two types of clarifying actions.

A method of constructing the filter element 2 as illustrated in Figs. 1 to 7 of the drawings is another feature of the present invention. In the manufacture of the filter element according to this method, a plurality of sheets or leaves 11 of the ribbed cellulosic wadding of a desired number of plies is selected and are assembled in a pile or stack as illustrated in Fig. 4 of the drawings—that is, with the ribs in the surface of one sheet in alignment with the ribs in the surface of an adjacent sheet, so as to provide the flow channels hereinbefore mentioned. The sheets 11 are of a length equal to the axial length of the tubular filter body 2 and are of a width greater than the radial thickness of said body with the ribs extending across the width of the sheets. After the required number of sheets to form a stack or pile of a length greater than the circumference of the inner tube 4 are assembled, as illustrated in Fig. 4, the pile or stack of assembled sheets is slightly compressed with an even pressure which serves to evenly distribute the several sheets through the pile. While subjected to this slight pressure, a strip of open-weave fabric 15, such as, cheese cloth, or similar material, is placed over one open surface of the stack as shown in Fig. 5, which surface is formed of aligned edges of the sheets 11. A suitable adhesive, such as, sodium silicate, is sprayed over the fabric and serves to cement each of the sheets or leaves 11 to the flexible backing 15. As illustrated in Fig. 5, the strip of flexible backing material 15 is allowed to extend beyond one end of the pile or stack of sheets 11 to form a tab 16, the purpose of which will be explained hereinafter.

After the flexible backing or binding strip 15 has been applied to the edges of the several sheets or leaves 11, as hereinbefore described, and the attachment is secure, the pile of sheets is bent into the form of a cylindrical tube, as shown in Fig. 6 of the drawings, with the backing strip 15 forming the inner surface of the tube and the free unattached edges of the sheets 11 forming the outer peripheral surface of the tubular member. After being bent to this form, adhesive is applied to the tab 16 which in turn is secured to the other end of the backing strip 15 to maintain the pile of sheets in the tubular form to which it has been bent.

At this stage of the process, the filter element will appear as shown in Fig. 6 with the sheets extending radially outwardly from the strip 15 and with the outer portions of the sheets spaced from each other to provide the open structure. In order to compact or consolidate the filter element 2, a relative rotation is effected between the inner and outer surfaces of the tubular body which tends to wrap the several sheets 11 against each other about the inner joined ends of the leaves and the binding strip 15 as a core. This action curves the sheets 11 as illustrated in Fig. 7 of the drawings. When the tubular body is consolidated as illustrated in Fig. 7, it may be wrapped with a suitable net-like material or it may be inserted directly into the outer perforated tube 3 which will retain the filter element in its consolidated condition.

In some instances, it may be desirable to construct a filter in which the sheets of cellulosic material extend in a truly radial direction, such as is illustrated in Fig. 8 of the drawings. It will be noted in this instance that the sheets of cellulosic material are of wedge-like formation in that they are of greater thickness adjacent their outer peripheral portions than at the ends forming the inner periphery of the tubular body. To construct a tubular filter element of this type, a number of sheets or leaves 11a of a filter material such as illustrated in Fig. 3 are assembled into a stack or pile in the same manner as illustrated in Fig. 4. Sufficient sheets are included in the stack to make the length of the stack slightly greater than the outer circumference of the tubular filter body to be made. In this instance, the sheets 11a are of a length equal to the axial length of the tubular filter body but the width is equal to the radial thickness of the tubular filter body. The stack or pile of sheets is then subjected to a pressure considerably greater than that employed in constructing the filter illustrated in Figs. 1 to 7, and, while under this great pressure, a backing strip 15a similar to the strip 15 shown in Fig. 5 is applied. Due to the great pressure exerted on the sheets of filter material, they are compressed to a considerable extent and after the strip of backing material 15a has been applied thereto, and the pressure released, the sheets 11a of the filter material other than the edges joined to strip 15a will tend to expand to substantially their normal thickness. The degree of compression of the stack necessary to construct the filter such as shown in Figs. 8 and 9 is such that the length of the backing strip will be approximately equal to that of the inner periphery of the tubular element to be constructed, and the length of the pile or stack of sheets or leaves 11a prior to and after compression will be slightly greater than the circumference of the cylindrical tubular filter body.

A filter element 2a constructed as just described and as shown in Figs. 8 and 9 will retain its shape after securing the tab 16a in place and will not require external wrapping.

Flow of liquid to be filtered will be radially through the channels or passages formed by the grooves 12a.

In this form of the filter the sheets of cellulosic material are of wedge shape form as appears from Fig. 8. Since the portions of the sheets or leaves of cellulosic material between the grooves 12a are easily compressible it is these portions which are compressed. This causes the passages formed by registering grooves 12a in two adjacent sheets to be tapered and be of gradually reduced cross section from the outer to the inner peripheral portions of the tubular filter element.

As a liquid such as oil flows from the outer to the inner periphery of the filtering element through the channels formed by the grooves 12a, resistance to its flow increases as the cross sectional area of the channels 12a decreases. This resistance to its flow causes a portion of the oil to be forced through the walls of the channels and into the leaves 11a where its solid impurities are trapped by the fibrous structure. Since the channels permit a free flow of oil over substantially the entire surface area of the leaves 11a and since the channels constrict continuously over their entire length, virtually the entire body of the element 2a is utilized as a filtering medium. It has been found that this action improves the clarification result, and also greatly increases the useful life of the filter.

Filter elements as herein described are very efficient in operation and may be easily constructed so that the replacement cost of filter units will be low.

I claim:

1. A filter unit comprising a tubular body of assembled sheets of filter material, the sheets extending generally radially from the inner surface of the body and being juxtaposed with one edge of each sheet lying in the inner surface of the tubular body and the opposite edge of each sheet lying in the outer surface of the tubular body, both of said edges being parallel to the axis of the body said sheets having a plurality of parallel trough-shaped depressions extending from the inner to the outer surface of the tubular body, and means joining together the edges of the sheets lying in the inner surface of the body.

2. A filter unit comprising a tubular body of assembled sheets of filter material, the sheets extending generally radially from the inner surface of the body and being juxtaposed with one edge of each sheet lying in the inner surface of the tubular body and the opposite edge of each sheet lying in the outer surface of the tubular body, both of said edges being parallel to the axis of the body, said sheets being curved intermediate their edges lying in the inner and outer surfaces of the tubular body having a plurality of parallel trough-shaped depressions extending from the inner to the outer surfaces of the tubular body, and means joining together the edges of the sheets lying in the inner surface of the body.

3. A filter unit comprising a tubular body of assembled sheets of filter material, the sheets extending generally radially from the inner surface of the body and being juxtaposed with one edge of each sheet lying in the inner surface of the tubular body and the opposite edge of each sheet lying in the outer surface of the tubular body, said sheets having a plurality of equally and axially spaced radially extending trough-shaped depressions on each side thereof extending from the inner to the outer surfaces of the tubular body, the depressions on both sides of each sheet being aligned with each other and with the depressions in adjacent sheets to form a plurality of channels extending from the inner to the outer surfaces of the tubular body for the free flow of liquid through the channels with the deposition of solids contained therein on the walls of said channels.

4. A filter unit comprising a tubular body of assembled sheets of filter material, the sheets extending generally radially from the inner surface of the body and being juxtaposed with one edge of each sheet lying in the inner surface of the tubular body and the opposite edge of each sheet lying in the outer surface of the tubular body, both of said edges being parallel to the axis of the body, said sheets having a plurality of equally and axially spaced parallel trough-shaped depressions on each side thereof extending from the inner to the outer surfaces of the tubular body to form a plurality of channels extending from the inner to the outer surfaces of the tubular body, and means joining together the edges of the sheets lying in the inner surface of the body.

5. A filter unit comprising a tubular body of assembled sheets of filter material, the sheets being juxtaposed with one edge of each sheet lying in the inner surface of the tubular body and the opposite edge of each sheet lying in the outer surface of the tubular body, both of said edges being parallel to the axis of the body, said sheets extending radially outwardly from the inner surface of the tubular body and then curving circumferentially throughout the rest of their length, said sheets having a plurality of equally and axially spaced parallel trough-shaped depressions on each side thereof extending from the inner to the outer surfaces of the tubular body, the depressions on contacting surfaces of adjacent sheets forming a plurality of channels extending from the inner to the outer surfaces of the tubular body for the free flow of liquid through the channels with the deposition of solids contained therein on the walls of said channels.

6. A filter unit comprising a tubular body of assembled sheets of filter material, the sheets being juxtaposed and extending radially of the tubular body with the inner and outer edges thereof lying parallel to the axis of the body, said sheets having a plurality of equally and axially spaced parallel trough-shaped depressions on each side thereof extending from the inner to the outer surfaces of the tubular body, the depressions on contacting surfaces of adjacent sheets being aligned to form a plurality of channels extending from the inner to the outer surfaces of the tubular body.

7. A filter unit comprising a tubular body of assembled sheets of filter material, the sheets extending generally radially from the inner surface of the body and being juxtaposed with one edge of each sheet lying in the inner surface of the tubular body and the opposite edge of each sheet lying in the outer surface of the tubular body, both of said edges being parallel to the axis of the body, said sheets being curved intermediate their edges lying in the inner and outer surfaces of the tubular body, said sheets having a plurality of equally and axially spaced parallel trough-shaped depressions on each side thereof extending from the inner to the outer surfaces of the tubular body, the depressions on contacting surfaces of adjacent sheets being aligned to form a plurality of channels extending from the inner to the outer surfaces of the tubular body.

8. A filter unit comprising a tubular body of assembled sheets of filter material, the sheets being juxtaposed and extending radially of the tubular body with the inner and outer edges thereof lying parallel to the axis of the body, the portion of the sheets adjacent the inner surface of the body being circumferentially compressed whereby the cross section of the sheets tapers from the outer edge to the inner edge thereof, said sheets having a plurality of equally and axially spaced parallel trough-shaped depressions on each side thereof extending from the inner to the outer surfaces of the tubular body, the depressions on contacting surfaces of adjacent sheets being aligned to form a plurality of channels extending from the inner to the outer surfaces of the tubular body.

9. A method of constructing tubular filter bodies comprising assembling a plurality of sheets of filter material in a pile, with one edge of each sheet aligned with the corresponding edges of the other sheets, joining said aligned edges together, and bending the pile of joined sheets into tubular form with the joined edges forming the inner surface of said tubular body.

10. A method of constructing tubular filter bodies comprising assembling a plurality of sheets of filter material in a pile, with one edge of each sheet aligned with the corresponding edges of the other sheets, compressing the pile of sheets, joining said aligned edges together, and bending the pile of joined sheets into tubular from with the joined edges forming the inner surface of said tubular body, the compression of the pile of sheets being such that after joining the sheets together and bending the pile into tubular form, the face portions of the sheets adjacent the outer edges thereof will contact similar portions of adjacent sheets.

11. A method of constructing tubular filter bodies comprising assembling a plurality of sheets of filter material in a pile, with one edge of each sheet aligned with the corresponding edges of the other sheets, joining said aligned edges together, bending the pile of joined sheets into tubular form with the joined edges forming the inner surface of said tubular body, and rotating the outer surface of the tubular body to wrap the sheets together and thereby consolidate the body.

SOUTHWICK W. BRIGGS.